United States Patent
Renders et al.

(10) Patent No.: US 7,242,528 B2
(45) Date of Patent: Jul. 10, 2007

(54) ELECTROWETTING MODULE

(75) Inventors: Christina Adriana Renders, Eindhoven (NL); Bernardus Hendrikus Wilhelmus Hendriks, Eindhoven (NL); Stein Kuiper, Eindhoven (NL); Robert Andrew Hayes, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 10/555,267

(22) PCT Filed: May 4, 2004

(86) PCT No.: PCT/IB2004/050576

§ 371 (c)(1),
(2), (4) Date: Nov. 1, 2005

(87) PCT Pub. No.: WO2004/099845

PCT Pub. Date: Nov. 18, 2004

(65) Prior Publication Data

US 2006/0209422 A1    Sep. 21, 2006

(30) Foreign Application Priority Data

May 6, 2003    (EP)    ................... 03076377

(51) Int. Cl.
*G02B 1/06* (2006.01)
(52) U.S. Cl. ...................................... 359/665
(58) Field of Classification Search ......... 359/665–667
See application file for complete search history.

(56) References Cited

U.S. PATENT DOCUMENTS

| 4,341,204 A | * | 7/1982 | Bloxsom ............... 126/651 |
| 6,369,954 B1 | * | 4/2002 | Berge et al. ............ 359/666 |

* cited by examiner

*Primary Examiner*—Timothy Thompson
*Assistant Examiner*—M. Hasan
(74) *Attorney, Agent, or Firm*—Michael E. Belk

(57) ABSTRACT

An electrowetting module (20) comprises a fluid chamber (8) which contains a first fluid (A) and a second fluid (B), which are separated by an interface (14), and means (16, 17) to exert a force on at least one of the fluids to change the position and/or shape of the interface. By providing the second fluid body with a dissolved or mixed compound, being insoluble in or immiscible with the first fluid body, and/or the first fluid body comprises a dissolved or mixed compound being insoluble in or immiscible with the second fluid body, in amounts sufficient for lowering the freezing point of the respective fluids to below −20° C., the performance of the module can be improved so that the module can be used at low temperatures.

12 Claims, 1 Drawing Sheet

ELECTROWETTING MODULE

The invention relates to an electrowetting module, comprising a fluid chamber, which contains at least a first body of a first conducting and/or polar fluid and a second body of a second non-conducting and/or non-polar fluid, said bodies being separated by an interface, and means for exerting a force on at least one of the bodies to change the position and/or shape of the interface.

It is observed that wetting techniques make it possible to manipulate a volume of a fluid along a predetermined path. With these techniques, the surface tension of said volume is locally altered (usually reduces), causing the volume to flow in the direction of its lowest surface tension.

Further, it is observed that a fluid is a substance that alters its shape in response to any force, and includes gases, vapors, liquids and mixtures of solids and liquids, capable of flow.

The term "wettability" of a surface by a certain fluid gives an indication of the ease with which said fluid may wet said specific surface, which may for instance depend on the nature of and/or the electric potential across said surface. If a surface has a "high wettability" by a specific fluid, this indicates that a droplet of said fluid in contact with said surface will have a rather expanded shape, with a relatively large contact area and a relatively small contact angle, usually less than about 90°. "Low wettability" indicates that the droplet in contact with said surface will have a rather contracted shape, with a relatively small contact area and a relatively large contact angle, usually exceeding about 90°.

The term "wetting" is understood to encompass all techniques causing the surface tension of a volume, e.g. a droplet of a specific fluid to be locally varied, so as to influence the wetting behavior of said fluid with respect to a specific surface.

In modules wherein use is made of the wettability phenomenon, it is necessary that the two fluids have desired properties, for example: densities as close as possible; low melting points; adapted viscosity; good electrowetting behavior; non poisonous; and, in case of an optical module, indices of refraction of a certain predetermined difference.

An example of such an optical module is an electrowetting-based lens, also called an electrowetting lens, of which the focal distance can be changed. In an electrowetting lens the interface between the two fluid bodies is a meniscus. In such a module the first fluid body is an electrically conducting and/or polar liquid and the second fluid body is an electrically non-conducting and/or non-polar liquid. The first liquid is, for example salted water and the second liquid is, for example an organic non-polar, water-immiscible liquid such as decane and silicone oil. The electrowetting optical module is provided with means for exerting an electrical force by means of which the shape and or the position of the meniscus can be shaped. Other examples of the electrowetting optical module are zoom lenses, diaphragms, diffraction gratings, filters and beam deflectors. Embodiments of these modules are described in PCT patent application no. IB03/00222 and in European patent applications nos. 020789309.2, 02080387.0 and 02080060.3. The electrowetting optical modules are very compact and may therefore be used with much advantage in devices, like optical disc scanning devices, mini cameras for a/o mobile phones, displays etc.

In optical electrowetting modules, the temperature range in which the module can be used depends greatly on the freezing point of the fluid bodies used. There is a growing demand for optical electrowetting modules, which will still work at temperatures well below 0° C., preferably at temperatures at approximately −20° C. Furthermore, the storage temperature should be as low as −40° C. To prevent damage to the housing, the liquids should preferably not solidify above this temperature.

The known aqueous solutions, and some non-conducting liquids, do not meet this requirement.

The problem of lowering the freezing point of the fluid body below approximately −20° C. remains thus to be solved.

It is an object of the invention to provide an electrowetting module as defined in the opening paragraph, which module, if used as an optical module, allows varying the optical power over a large range and can still be used at a low temperature. The electrowetting module is characterized in that the second fluid body comprises a dissolved or mixed compound, being insoluble in or immiscible with the first fluid body, and/or the first fluid body comprises a dissolved or mixed compound being insoluble in or immiscible with the second fluid body, said amounts of compounds being sufficient for lowering the freezing point of the respective fluids to below −20° C. The freezing point is preferably lowered to below −30° C. Even more preferred the freezing point should be lowered to −40° C. in order to allow storage of the device at all environmental circumstances. Experiments have shown that a solution having a concentration of 4 M is required to lower the freezing point of the most suitable fluids to −20° C., as will be explained hereafter.

It is remarked that an electrowetting lens with a first fluid body consisting of salted water is disclosed for example by B. Berge and J. Peseux in Eur. Phys. J.E3, 159–163 (2000). Said fluid body consists more specifically of a few percent of $Na_2SO_4$ in water. Such an amount of dissolved salt is nevertheless too low to decrease the freezing point substantially.

Inorganic salts containing cations having an atomic weight below 50 u, preferably below 40 u, are very suitable for use in the conductive fluid of the electowetting module of the invention, because these compounds have the additional advantage that the density as well as the refractive index of the solution will still have a low value. Preferred compounds are chlorine salts, more specifically lithium chloride.

It is observed that it is known from JP-2001013306 A to use an aqueous 10 wt. % solution of sodium chloride as the conductive liquid in an electrowetting lens. Such an amount of salt corresponds with a 1.83 M solution; it is only possible to obtain a freezing point depression of up to −6.5 C with such a solution.

Preferred compounds to be used in the second, non-polar fluid body for lowering the freezing point of said body are claimed in claim 7.

A module as indicated above may be configured as an optical component, the first and said second fluid body having different refractive indices. In such an optical module the salt added to the first conducting fluid has a refractive index difference maintaining effect.

In such a module the first fluid body may be electrically conducting and/or polar, and the second fluid body may be electrically non-conducting and/or non-polar and the module may be provided with means for exerting an electrical or mechanical force to change the position and/or shape of the meniscus-shaped interface.

The difference in refractive index is from 0.01 to 0.3, preferably from 0.1 to 0.2; the refractive index of one of the fluid bodies being greater than 1.4, preferably greater than 1.5.

Preferably the first and second fluid bodies show a substantially similar density.

The module may also be provided with means for exerting a pressure to change the position and/or shape of the interface.

These and other aspects of the invention will be apparent from and elucidated by way of non-limitative example with reference to the embodiments described hereinafter and illustrated in the accompanying drawings.

Figure 1:
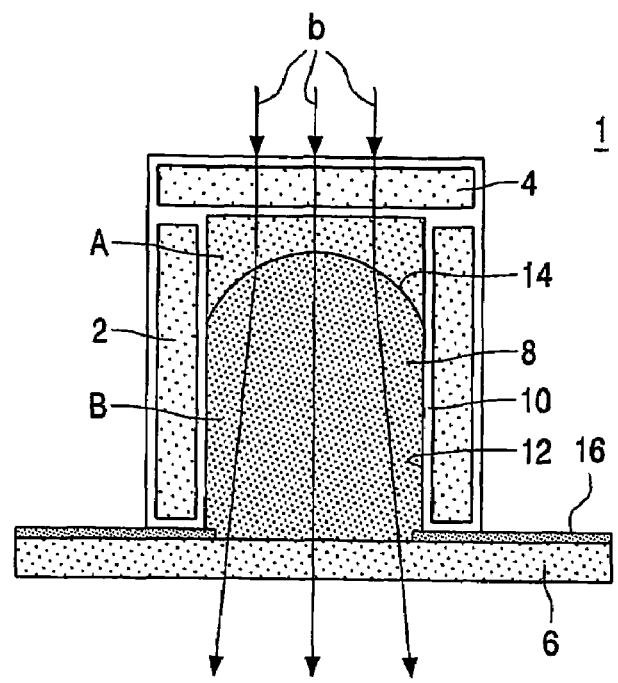
FIG. 1 shows, in a cross-section through its optical axis, a known electrowetting lens in a non-activated state.

FIG. 1 shows an electrowetting module constituting a variable focus lens. The element comprises a first cylindrical electrode 2 forming a capillary tube, sealed by means of a transparent front element 4 and a transparent rear element 6 to form a fluid chamber 8 containing two fluids. The electrode 2 may be a conducting coating applied on the inner walls of a tube.

In this embodiment of the electrowetting module the two fluids consist of two non-miscible liquids in the form of an electrically insulating first liquid A, currently, for example a silicone oil or an alkane, and an electrically conducting second liquid B, currently, for example, water containing a salt solution. The first fluid A has a higher refractive index than the second fluid B.

The first electrode 2 is a cylinder of inner radius typically between 1 mm and 20 mm. This electrode is formed of a metallic material and is coated by an insulating layer 10, formed for example of parylene. The insulating layer has a thickness of between 50 nm and 100 μm. The insulating layer is coated with a fluid contact layer 12, which reduces the hysteresis in the contact angle of the meniscus 14, i.e. the interface between the fluids A and B, with the cylindrical wall of the fluid chamber. The fluid contact layer is preferably formed from an amorphous fluorocarbon such as Teflon™ AF1600 produced by DuPont™. The fluid contact layer 12 has a thickness between 5 nm and 50 μm. It is also possible that one layer is used with both insulating and hydrophobic properties.

A second electrode 16 is arranged at one side of the fluid chamber, in this case, adjacent the rear element 6. The second electrode is arranged such that at least one part thereof is in the fluid chamber, so that the electrode can act on the second fluid B.

The two fluids A and B are non-miscible so as to tend to separate into two fluid bodies separated by a meniscus 14. When no voltage is applied between the first and second electrodes, the fluid contact layer 12 has a higher wettability with respect to the first fluid A than with respect to the second fluid B. FIG. 1 shows this lens configuration, i.e. the non-activated state of the electrowetting lens. In this configuration, the initial contact angle θ between the meniscus and the fluid contact layer 12, measured in the fluid B, is larger than 90°. Since the refractive index of the first fluid A is larger than the refractive index of the second fluid B, the lens formed by the meniscus, here called meniscus lens, has a negative power in this configuration.

Figure 2:
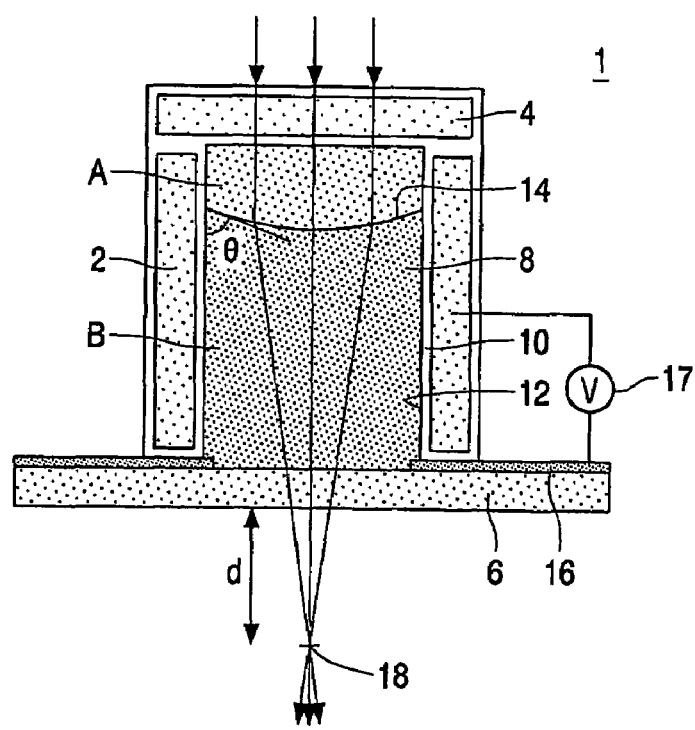
FIG. 2 shows such a lens in an activated state.

Due to electrowetting, the wettability by the second fluid B varies under the application of a voltage between the first electrode and the second electrode, which tends to change the contact angle. FIG. 2 shows the lens configuration if such a voltage from a source 17 is supplied to the lens, i.e. if the lens is in the activated state. In this case the voltage is relatively high, for example between 150V and 250V and the meniscus has now a convex shape, with respect to the body of the electrolyte. The maximum contact angle θ between the meniscus and the fluid contact layer 12 is, for example of the order of 60°. Since the refractive index of fluid A is larger than fluid B, the meniscus lens 1 in this configuration has a positive power and it focuses an incident beam b in a focal spot 18 at a certain distance d from the lens.

For further details about the construction of the variable focus lens reference is made to international patent application no. IB03/00222. A zoom lens, which comprises at least two independently controllable interfaces between a higher refractive index liquid and lower refractive index fluid, is described in the European patent application no. 02079473.1 (PHNL021095).

In practice there is a need to lower the freezing point of the conducting liquid of an electrowetting module so that the module will still work at temperatures of for example −20° C.

Of course, the electrowetting properties of the module should be maintained at such low temperatures.

A known method to lower the freezing point of a liquid is to dissolve a salt in the liquid. The theoretical freezing point depression reached by a given amount of salt in moles of ions per kilogram liquid can approximately be determined form the equation:

$$\Delta T_f = K_f c_m$$

wherein $\Delta T_f$ is the change in freezing point, $K_f$ is the freezing point depression constant, and $c_m$ is the molar concentration of ions of the solution.

It follows from this equation that large concentrations of salt are needed to effect a sufficient drop in the freezing point. Nevertheless, by dissolving too much salt in the liquid, the density of the liquid may increase too much, and as a result, the required density matching between the conductive and non-conductive liquids can not always be met.

Further, dissolving salt in a liquid may give rise to a change in refractive index. When the refractive index of the conductive liquid increases upon the addition of a salt, the refractive index between this liquid and the non-conductive liquid decreases (provided that the non-conductive liquid has a higher refractive index than the conducting liquid), which results in an undesirable decrease in optical power range of an electrowetting lens.

In an electrowetting lens the optical power of the lens depends on the curvature of the meniscus and the difference in refractive indices between the conductive and non-conductive liquids, as can be seen in the following equation:

$$S = \frac{n_1 - n_2}{r}$$

Wherein S is the optical power of the meniscus lens, r the radius of curvature of the meniscus, $n_2$ the refractive index of the non-conductive liquid and $n_1$ the refractive index of the conductive liquid.

The non-conductive liquids currently used in electrowetting lenses (e.g. alkanes or silicone oils) have a refractive index (n=1.37–1.43) that is only slightly larger than the refractive index of the currently used conductive liquids (e.g. water, n=1.33).

According to the present invention an amount of a compound, preferably an inorganic salt, sufficient for lowering the freezing point of the first conductive fluid to approximately −20° C., is added to said first conductive fluid, whereby said salt preferably contains cations having a low molecular weight of below 50 u.

This measure will keep the refractive index and density for the conductive liquid low, whilst the other requirements for the liquid, such as high transparency, non-miscibility with the other liquid or fluid, and a good electrowetting behavior can still be satisfied.

Examples of some liquids and their freezing point depression constants to obtain a freezing point of −20° C. are given in Table 1.

TABLE 1

| Solvent | Melting point (° C.) | $K_f$ (° C./m) | $c_m$ for −20° C. |
|---|---|---|---|
| Water | 0.000 | 1.858 | 10.8 |
| Acetic acid | 16.60 | 3.59 | 10.2 |
| Benzene | 5.455 | 5.065 | 5.0 |
| Camphor | 179.5 | 40 | 5.0 |
| Cyclohexane | 6.55 | 20.0 | 1.3 |

In table 1 is $c_m$ the molar concentration of the ions in the solution to obtain a freezing point below −20° C. Since each salt molecule gives rise to at least two ions, the required amount of salt dissolved in the liquid is smaller than cm by at least a factor of two. When, for example LiCl is used as the inorganic salt in the conductive liquid, a solution of 5.4 M LiCl is required to lower the freezing point of water to −20° C.

From experiments it follows that for the most suitable fluids used in the electrowetting module a solution having a concentration of 4 M is required to lower the freezing point to −20° C. Although here inorganic salts are mentioned also organic compounds, such as for instance ethyleenglycol, ethanol or methanol may be used. Again experiments show that 4 M molecules of organic materials are required to lower the freezing point to −20° C.

It is observed that it is known from US 2003/0095336 A1, paragraph [0063], to use an alcohol, glycerin, silicone or mineral oil to lower the freezing point of a fluid body of an optical element, more specifically a lens. This lens is nevertheless not based on electrowetting; the description, further, does not mention any concentration, nor an indication about the advantages of certain concentrations of the compounds to be used.

As has been mentioned before, it is preferred that the cations constituting the inorganic salt have a low molecular weight, preferably below 40 u.

A preferred group of compounds to be used in the present invention consist of LiCl, $NH_4Cl$ en NaCl, whereof LiCl is the most preferred compound, to be used with water as the conductive solvent. Fluorine salts can also be used, provided that they give the desired freezing point depression.

Yet another preferred group of compounds consists of salts with formate or acetate as the cations, e.g. ammonium formate or lithium formate.

Further, it can be necessary to lower the freezing point of the second, non-polar fluid also. Preferred compounds to be used in this fluid are carbon tetrabromide, trichlorobenzene, naphthalene and biphenyl.

When use is made of an inverted lens in an electrowetting optical module, the conductive liquid has a higher refractive index than the non-conductive liquid. In such a case, an increase in the refractive index of the conductive liquid is desired. This can be obtained when a salt is used whereof the cation has a high molecular weight, i.e. higher than 40 u, such as for example $Cs_2WO_4$, whereof an aqueous solution has a refractive index n=1.482. When combined with a non-conductive liquid having a low refractive index, such as a silicon oil whereof n=1.37, an optical electrowetting module can be made, which has a large optical power.

To allow density matching of the conductive liquid with the non-conductive liquid in an inverted lens, it is nevertheless required that the conductive liquid should be mixed with a compound having a lower density, to match with the density of the non-conductive liquid, usually a silicone oil.

Although the description has been limited to an electrowetting lens as an example of an optical electrowetting module, the invention is not in any way limited to such a lens. The invention may be used in any optical electrowetting module, such as a variable-focus lens, a zoom lens, a diaphragm, a filter and a beam deflector, but also in a mechanical electrowetting module as a pump and a motor.

The invention claimed is:

1. An electrowetting module comprising a fluid chamber, containing at least a first body of a first conducting and/or polar fluid and a second body of a second non-conducting and/or non-polar fluid, the two bodies being separated by an interface, and means for exerting a force on at least one of the bodies to change the position and/or shape of the interface, characterized in that the second fluid body comprises a dissolved or mixed compound being insoluble in or immiscible with the first fluid body, and/or the first fluid body comprises a dissolved or mixed compound being insoluble in or immiscible with the second fluid body, said amounts of compounds being sufficient for lowering the freezing point of the respective fluids to below −20° C.

2. An electrowetting module as claimed in claim 1, wherein the amount of the dissolved compound is sufficient for lowering the freezing point of the respective fluid to below −30° C., preferably to −40° C.

3. An electrowetting module as claimed in claim 1, wherein the concentration of said dissolved compound in said fluid body is at least 4 M, preferably 6 M.

4. An electrowetting module as claimed in claim 1, wherein said compound being dissolved in or mixed with the first body of fluid is an inorganic salt containing cations having an atomic weight below 50 u, preferably below 40 u.

5. An electrowetting module as claimed in claim 4, wherein said inorganic salt is a chlorine salt, preferably lithium chloride, ammonium chloride or sodium chloride, more preferably lithium chloride.

6. An electrowetting module as claimed in claim 1, wherein said compound being dissolved in or mixed with the first body of fluid is an organic compound, preferably selected from among methanol, ethanol and ethylene glycol.

7. An electrowetting module as claimed in claim 1, wherein said compound being dissolved in or mixed with the second body of fluid is selected from carbon tetrabromide, dibromobenzene, tribromobenzene, dichlorobenzene, trichlorobenzene, naphthalene and biphenyl.

8. A module as claimed in claim 1, configured as an optical component, the first and said second fluid bodies having different refractive indices, wherein the compound added to said first fluid has a refractive index difference increasing effect.

9. A module as claimed in claim 8, wherein the first fluid body is electrically conducting and/or polar, and the second fluid body is electrically non-conducting and/or non-polar, the module being provided with means for exerting an electric force to change the position and/or shape of the meniscus-shaped interface.

10. A module as claimed in claim 8, wherein the difference in refractive index is from 0.01 to 0.3, preferably from 0.1 to 0.2; the refractive index of one of the bodies being greater than 1.4, preferably greater than 1.5.

11. A module as claimed in claim 8, wherein said first and said second fluid bodies show a substantially similar density.

12. A module as claimed in claim 8, provided with means for exerting a pressure to change the position and/or shape of the interface.

* * * * *